United States Patent [19]

Scourtes

[11] Patent Number: 4,489,824
[45] Date of Patent: Dec. 25, 1984

[54] APPARATUS FOR STOPPING ARTICLES ON A CONVEYOR

[75] Inventor: George Scourtes, Plymouth, Mich.

[73] Assignee: The Allen Group Inc., Saginaw, Mich.

[21] Appl. No.: 133,804

[22] Filed: Mar. 25, 1980

[51] Int. Cl.³ .............................................. B65G 47/88
[52] U.S. Cl. ...................................... 198/633; 193/40; 271/245
[58] Field of Search ............... 198/345, 368, 633, 634; 193/32, 40, 35 A; 104/249, 250, 252, 254, 256; 271/224, 245–247; 414/101

[56] References Cited

U.S. PATENT DOCUMENTS

| | | | |
|---|---|---|---|
| 2,306,955 | 12/1942 | Karbusky | 193/32 X |
| 2,496,916 | 2/1950 | Kershaw | 104/252 |
| 2,624,440 | 1/1953 | Hornberger | 193/40 X |
| 3,527,087 | 9/1970 | Converse et al. | 198/339 X |
| 3,831,528 | 8/1974 | Redlichs | 104/250 |
| 4,136,763 | 1/1979 | Pryor et al. | 198/368 X |
| 4,144,960 | 3/1979 | Scourtes | 198/339 |

FOREIGN PATENT DOCUMENTS 543811 9/1959 Belgium ........................... 104/256

Primary Examiner—Jeffrey V. Nase
Attorney, Agent, or Firm—Learman & McCulloch

[57] ABSTRACT

A continuously movable conveyor supports a plurality of articles for movement along a path leading to and beyond a zone at which selected articles are transferred from and returned to the conveyor. At the transfer zone is stop apparatus movable from a position clear of the path of movement of the articles on the conveyor to a position in which it projects into such path of movement so as to engage and stop an oncoming article as the conveyor continues to move. The stop apparatus includes a stop member supported by a parallelogram linkage which is rockable by an extensible and retractable hydraulic ram to effect movements of the stop member into and out of the path of conveyor borne articles. The coupling of the ram to the stop member includes a lost motion connection enabling displacement of the stop member upon engagement of the latter by an article on the conveyor and the ram is yieldably retractable in response to such engagement so as to absorb and cushion the shock of such engagement. Following stopping of the article on the conveyor the ram returns to its extended position and locates the stop member in such position that, upon retraction of the ram to move the stop member out of the path of movement of conveyor borne articles, the stop member has a component of movement along the conveyor path so as to avoid the imposition of binding forces on the stop member by the article engaged thereby.

19 Claims, 10 Drawing Figures

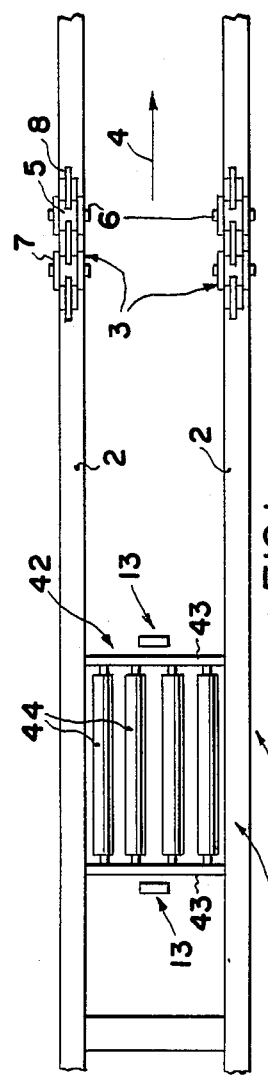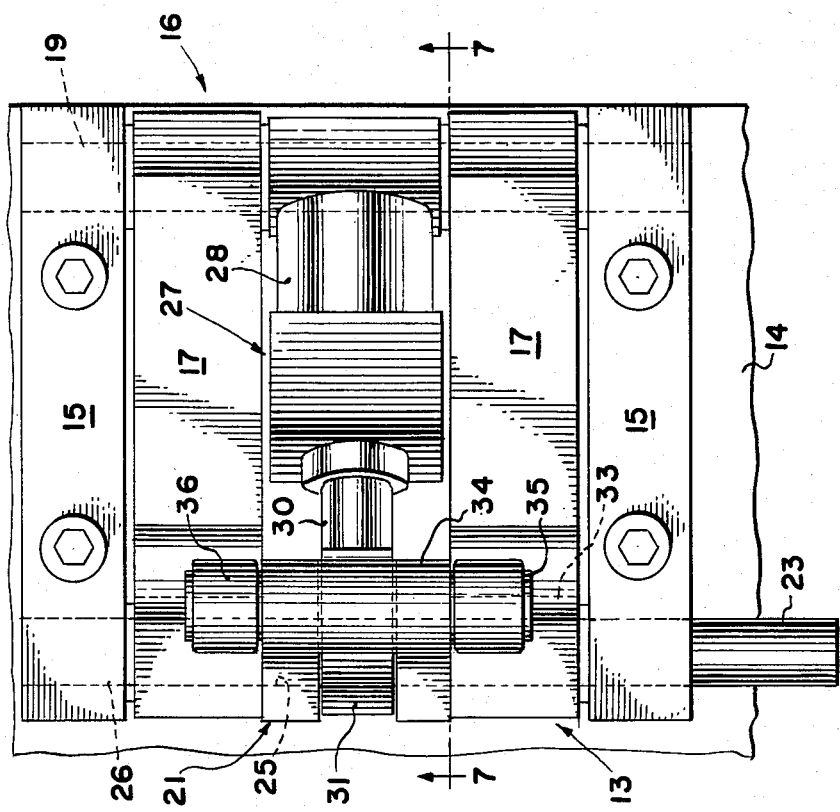
FIG.1
FIG.5
FIG.2

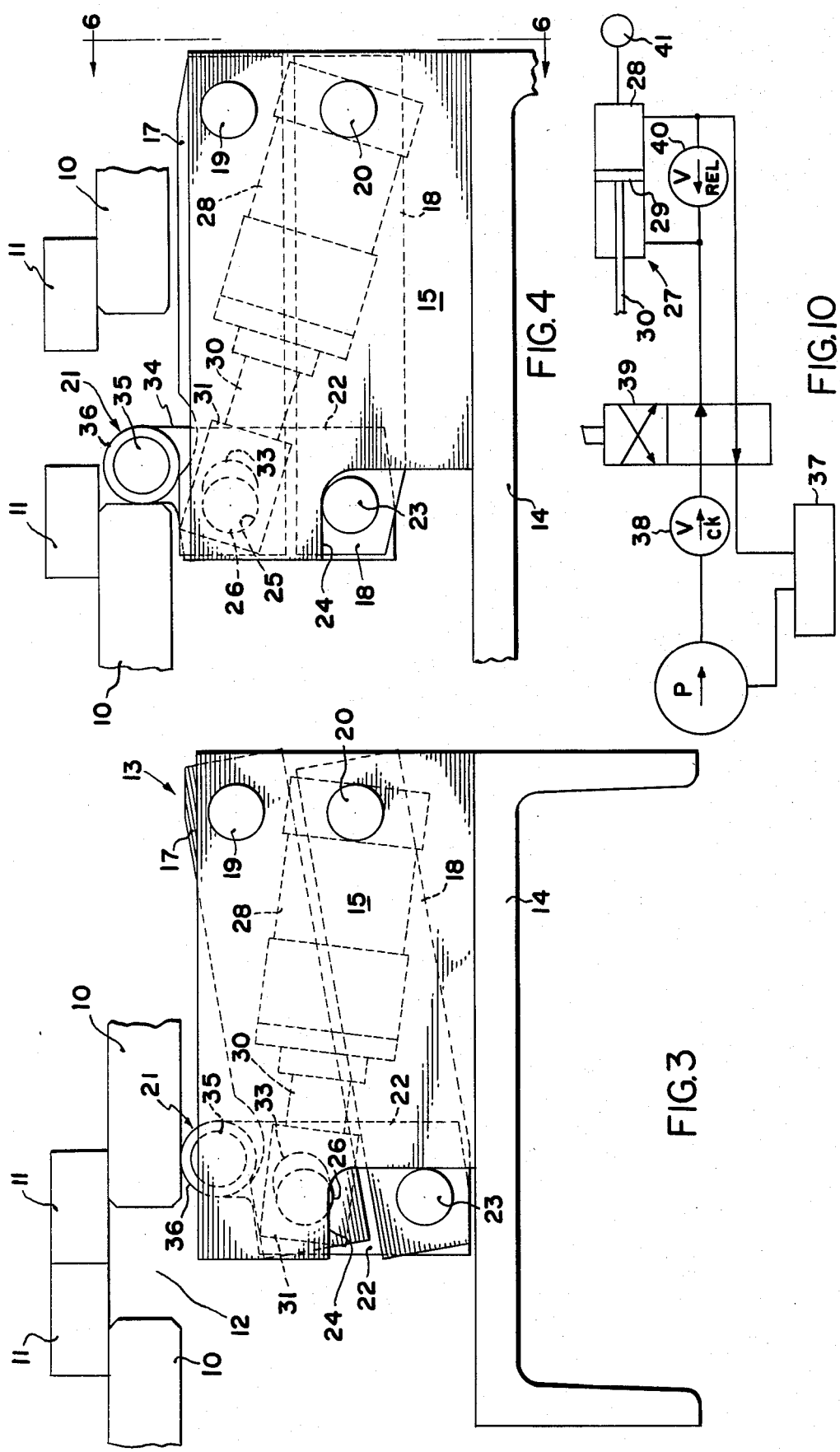

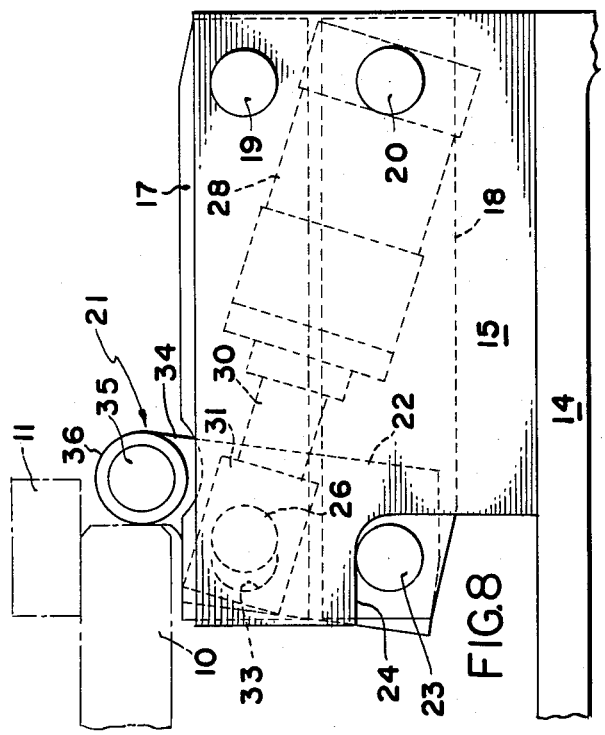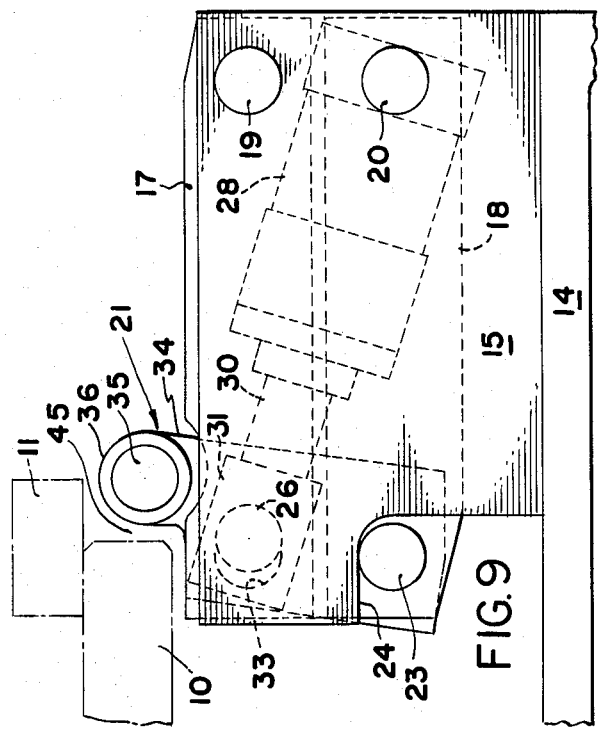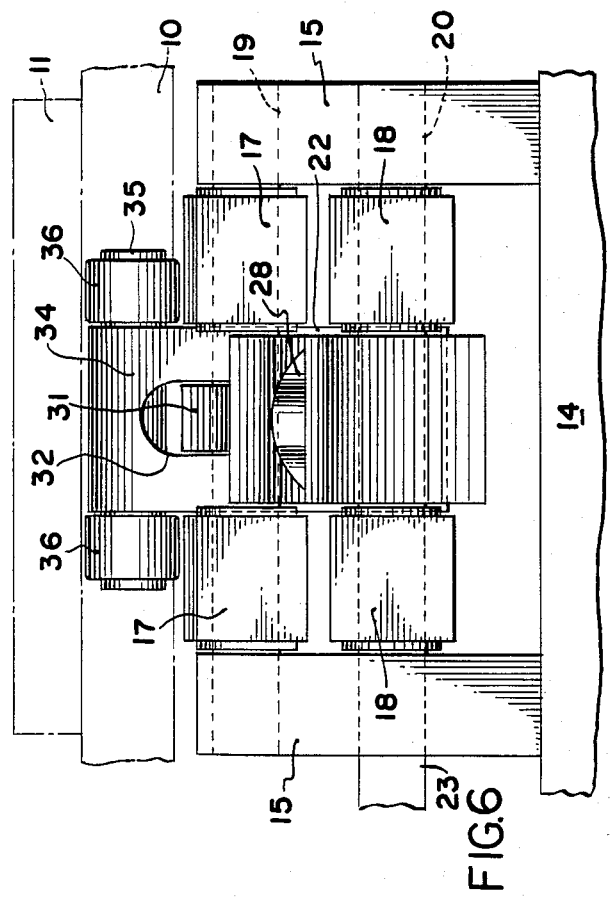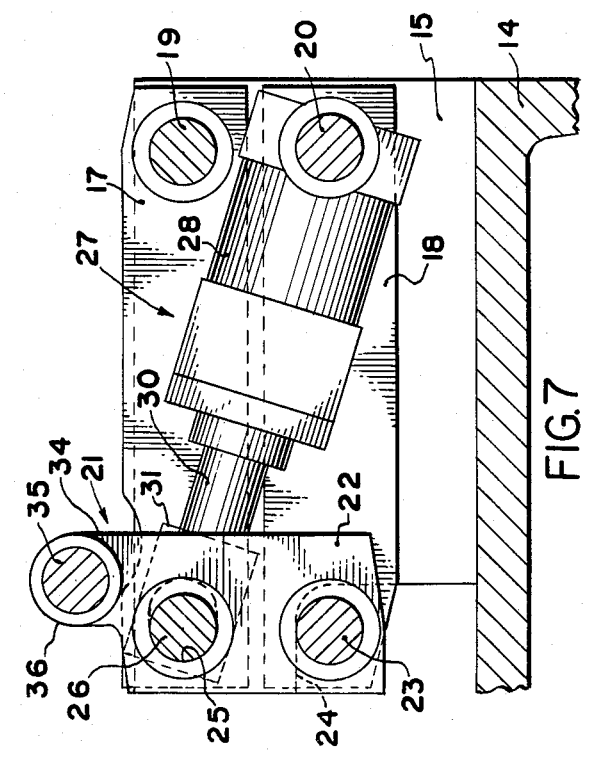

APPARATUS FOR STOPPING ARTICLES ON A CONVEYOR

BACKGROUND OF THE INVENTION

This invention relates to material handling apparatus of the kind wherein articles to be treated at a work station are conveyed in succession along a continuously movable, endless conveyor that extends to and beyond the work station. When an article requiring treatment in a work station is presented by the conveyor to a zone adjacent the work station, such article is stopped and transferred from the conveyor to the work station for treatment. Other articles on the conveyor then continue their movement past the occupied work station. When the treatment of the article is concluded, the treated article is returned to the conveyor. To ensure the provision of space on the conveyor to accommodate the treated article, those articles upstream from the transfer zone are stopped during return movement of the treated article to the conveyor. Thereafter, the stopped articles are released and they continue their movement along the conveyor.

The prior art contains many examples of mechanisms for transferring articles from a continuously movable, endless conveyor to a work station for treatment of the article, following which the treated article is returned to the conveyor. Typical of such prior art are U.S. Pat. Nos. 2,884,113; 3,088,197; 3,527,087; 3,631,967; and 3,648,819. These prior art mechanisms include means for stopping articles on the conveyor, but the stopping of an article is abrupt, rather than cushioned, thereby subjecting the stopping mechanism to possible damage and, in addition, subjecting workpieces supported by such articles to the possibility of being dislodged or shifted.

Another disadvantage of known prior art stopping mechanisms of the kind referred to is that the projection of a stop member into the path of an oncoming article on the conveyor sometimes effects engagement of the stop member with the lower surface of a conveyor-supported article. If such article is relatively light in weight, engagement between the article and the stop member may dislodge the article. If the article is relatively heavy, engagement of the article by the stop member may effect undue wear or damage to the stop member and its associated operating means.

The above mentioned objectionable characteristics of the known prior art stopping mechanisms have been overcome to a large extent by mechanisms of the kind disclosed in U.S. Pat. No. 4,144,960 and in co-pending application Ser. No. 224,255 a continuation of application Ser. No. 12,644, filed Feb. 16, 1979, both abandoned. Each of these mechanisms is constructed in such manner as to prevent dislodgment of an article from the conveyor or damage to the stop mechanism in the event the latter is projected toward the path of articles moving on the conveyor and engages an article other than the one to be stopped, and each of such mechanisms provides for the cushioned stopping of a selected article. In these mechanisms, however, the cushioning devices are independent of and in addition to the means by which the stop is projected and retracted, thereby necessitating the provision of multiple parts with the attendant expense in the manufacture, assembly, and maintenance thereof.

SUMMARY OF THE INVENTION

Apparatus constructed in accordance with the invention is especially adapted for use in stopping selected articles supported on a continuously movable conveyor and includes a stop member movable from a first, inactive position clear of the path of movement of the articles to a second, operative position in which the stop member projects into the path of an on-coming article to engage and stop the latter while the conveyor continues to move. Upon engagement of the stop member by an article on the conveyor, the stop member is capable of limited, damped movement in the direction of movement of the conveyor so as to cushion or absorb the shock of engagement between the article and the stop member.

Apparatus constructed in accordance with the invention includes a yieldable extensible and retractable hydraulic ram operable to move the stop member between its inactive and operative positions, the ram being so constructed that it not only effects such movements of the stop member, but also functions as the means for cushioning or absorbing the shock of engagement between an article on the conveyor and the stop member. The ram also is so constructed that, should the stop member be projected toward its operative position and engage an article on the conveyor, rather than enter a space between two adjacent articles, the ram may stall until the engaged article moves past the stop member, whereupon the ram completes the movement of the stop member to its operative position. The ability of the ram to stall under these conditions avoids dislodgement of the article from the conveyor and avoids damaging the stop mechanism.

A particularly advantageous characteristic of apparatus constructed according to the invention is the provision of a lost motion connection between the stop member and its operating ram. The lost motion connection enables limited movement of the stop member so as to provide for the shock absorbing function referred to above, and it also makes possible return movement of the stop member to its inactive position in such manner as to avoid the imposition of binding forces on the stop member and its operating mechanism because of the engagement between a stop member and an article on the conveyor.

BRIEF DESCRIPTION OF THE DRAWINGS

Apparatus constructed in accordance with the disclosed embodiment of the invention is disclosed in the accompanying drawings, wherein:

FIG. 1 is a diagrammatic, fragmentary, top plan view of a conveyor equipped with apparatus constructed in accordance with the invention;

FIG. 2 is an enlarged, side elevational view of the stop apparatus, with parts broken away and illustrating the position of the stop apparatus in its inactive position;

FIG. 3 is a view similar to FIG. 2, but illustrating the parts in the positions they occupy when the stop member has been moved toward its operative position and with the stop member engaging the underside of an article supported on the conveyor;

FIG. 4 is a view similar to FIG. 3, but illustrating the stop member projected to its fully operative position; the stop member being shown in the position it occupies at the instant of its engagement by an article on the conveyor, as well as the position it occupies following cushioned stopping of such article;

FIG. 5 is a top plan view of the apparatus and illustrating the parts in the positions they occupy in FIG. 4;

FIG. 6 is an end elevational view taken along the line 6—6 of FIG. 4;

FIG. 7 is a sectional view taken on the line 7—7 of FIG. 5;

FIG. 8 is a view similar to FIG. 4, but illustrating the stop member in the position it occupies during the cushioned stopping of the article on the conveyor;

FIG. 9 is a view similar to FIG. 4, but illustrating the parts in the positions they occupy at the commencement of retraction of the stop member from its operative position to its inactive position; and FIG. 10 is a schematic hydraulic diagram of the operating mechanism for the stop apparatus.

DETAILED DESCRIPTION

Apparatus constructed according to the disclosed embodiment of the invention is adapted for use with a conventional conveyor 1 having spaced apart supports or rails 2 on which is supported a pair of parallel, endless chains 3, the upper runs of which are driven along a path indicated by the arrow 4 by a suitable drive motor (not shown). Each chain 3 is of the kind more fully disclosed in U.S. Pat. No. 4,144,960 and includes links 5 joined to one another by pins or axles 6 on which are mounted freely rotatable rollers 7 and friction rollers 8. The rollers 8 are rotatable upon the application of force to the rollers, but in the absence of such force they do not rotate. The friction rollers 8 are of larger diameter than the rollers 7 so as to project both above and below the upper and lower surfaces of the rollers 7.

The rollers 8 engage the lower surface of and support an article such as a pallet 10 which preferably is square in plan and has four non-metallic bumpers 11 clamped to its upper surface. Each bumper projects beyond the associated edge of the pallet. Each pallet 10 is adapted to be fitted with a suitable fixture (not shown) for supporting a workpiece or other article (not shown).

The conveyor chains 3 are driven continuously so that pallets supported on the friction rollers 8 will be conveyed in succession along a path leading to and beyond one or more transfer zones T. As long as no resistance is offered to movement of the pallets along the path, the friction rollers 8 do not rotate. If a force is imposed on any one of the pallets to stop its movement along the conveyor path, the conveyor chains 3 will continue to move and the frictional force which normally prevents the rollers 8 from rotating will be overcome, thereby enabling rotation of the roller 8 along the lower surface of the stopped pallet 10. Pallets following the stopped pallet will continue to be moved by the conveyor until such time as they encounter a stopped pallet, whereupon the succeeding pallets also will be stopped and accumulated, but the conveyor chains 3 nevertheless will continue to move. A conveyor of this kind normally is referred to as an asynchronous conveyor and is well known in the art.

The bumpers 11 are so constructed and arranged on the respective pallets 10 that the confronting bumpers of a pair of adjacent pallets will engage one another, thus providing a gap or space 12 (FIG. 3) between adjacent pallets for a purpose presently to be explained.

The stop apparatus according to the preferred embodiment of the invention is designated generally by the reference character 13 and comprises a sub-frame 14 secured to the conveyor main frame. Fixed to the sub-frame 14 is a pair of upstanding, parallel, spaced apart frame members 15. Between the frame members 15 is a parallelogram linkage 16 composed of two pairs of upper and lower links 17 and 18, respectively. The links 17 are pivoted at corresponding ends by a pin 19 spanning the frame members 15 and the lower links 18 are pivoted at corresponding ends by means of a pin 20 which also spans the frame members 15. The axes of the pivot pins 19 and 20 are in the same vertical plane and the upper links 17 and the lower links 18 are rockable about fixed, vertically spaced axes.

Accommodated between the pairs of links 17 and 18 and at those ends of the latter remote from the pivot pins and 20 is a stop member 21 having a body 22 (best shown in FIG. 7). The body is pivotally connected to the lower links 18 by a pin 23 which spans both of the links 18 and extends beyond one of the latter to underlie a shoulder 24 formed in the corresponding frame member 15. Spanning the upper links 17 and journaled in an opening 25 in the stop body 22 is a coupling pin 26 which will be referred to in more detail hereinafter.

The construction and arrangement of the parallelogram linkage and the stop member 21 as thus far described are such that rocking movement of the pairs of links 17 and 18 about their respective pivot axes 19 and 20 will cause the stop body 22 to move vertically toward and away from the path 4 of movement of articles on the conveyor 1.

Operating means 27 is provided for effecting such vertical movements of the stop member and comprises a hydraulic ram having a cylinder 28 pivoted to the frame members 15 by the pivot pin 20. Within the cylinder 28 is a piston 29 (FIG. 10) from which extends a piston rod 30 at the free end of which is a fitting 31 which is accommodated in a slot 32 formed in the stop body 22. The fitting 31 has an opening therein in which the coupling pin 26 is snugly accommodated. The pin 26 extends beyond the fitting 31 and couples the operating ram 27 to the upper links 17 by passing into an elongate slot 33 formed in each of the links 17. The longitudinal axis of each slot 33 parallels the longitudinal axis of the associated link 17. As a consequence of the provision of the slots 33, the stop body 22 is capable of limited rocking movement relative to the links 17 about the axis of the pivot pin 23 for a purpose presently to be explained.

At the upper end of the stop body 22 is an extension 34 in which is fixed a shaft 35 at the opposite ends of which is journaled a pair of stop rollers 36.

The hydraulic circuit for the operating ram 27 is shown schematically in FIG. 10 and includes a hydraulic pump P which is supplied with hydraulic fluid from a reservoir 37 and delivers it through a check valve 38 to a reversing valve 39. The reversing valve controls the flow of hydraulic fluid to the opposite ends of the cylinder 28 and to the reservoir 37, and between the opposite ends of the cylinder is a pressure relief valve 40. The cylinder 28 optionally may include a yieldable pressure accumulator 41 the purpose of which will be explained during the description of the operation of the apparatus.

THE OPERATION

In the operation of the apparatus a plurality of articles supported by the pallets 10 are moved continuously along the path 4 by the conveyor 3. When a selected pallet reaches the transfer zone T the stop apparatus 13 is actuated to move the stop member into the path of movement of the pallets so as to engage the leading end of the selected pallet and interrupt its movement by the conveyor.

As is diagrammatically indicated in FIG. 1, the stop mechanisms 13 are used in pairs spaced longitudinally along the path of movement of the pallets 10 and at opposite ends of the transfer zone T. Each stop mechanism of each pair operates simultaneously, and the spacing between the stop mechanisms of each pair is such as to accommodate a pallet between them with a space between the leading pallet and the immediately following pallet. Those pallets following the immediately trailing pallet will engage the latter and one another so as to accumulate on the conveyor 1 upstream from the transfer zone T.

At the transfer zone T is an elevator unit 42 positioned between the rails 2 of the conveyor 1. The elevator comprises a frame having spaced apart end members 43 which are spanned by rollers 44 journaled in the end members and coupled to driving means (not shown). In the inactive position of the elevator the rollers 44 occupy a level below that of the pallets 10 on the conveyor 1. When a pallet has been stopped by the stop mechanism 13 immediately downstream from the elevator 42, thereby positioning a pallet above the elevator, the latter may be raised to a level in which the pallet is lifted off the friction rollers 8 and is supported by the rollers 44. The rollers 44 may be driven so as to shift the pallet off and to one side of the conveyor for reception by a carriage or the like such as is illustrated in U.S. Pat. No. 4,144,960.

The elevator 42 is capable of transferring pallets off the conveyor to one side of the latter and returning a pallet from a position off the conveyor onto the latter. In either case, the stop members flanking both ends of the elevator will be actuated to occupy their raised positions so as to accumulate pallets upstream from the elevator. When a pallet is to be returned to the conveyor, the elevator will be in its raised position so as to enable the driven rollers 44 to locate the pallet vertically above the conveyor 1. Thereafter, the elevator 40 may be lowered so as to deposit the pallet onto the friction rollers 8, following which the stop members may be lowered, whereupon the pallets will continue their movement on the conveyor path.

When it is desired to stop a selected pallet at the transfer zone T, the operating ram 27 is extended from the position shown in FIG. 2 toward the position shown in FIG. 4. Extension of the ram is accomplished by shifting the reversing valve 39 from the position shown in FIG. 10 so that fluid is delivered by the pump P to that end of the cylinder 28 that is to the right of the piston 29. That end of the cylinder which is to the left of the piston 29 will be in communication with the reservoir 37, thereby enabling the piston 39 to move toward the left and extend the ram.

When the ram is in the retracted condition shown in FIG. 2, the coupling pin 26 is at the right-hand end of the slots 33 in the links 17. Extension of the ram, therefore, will move the coupling pin 26 to the opposite end of the slots 33, accompanied by the initiation of clockwise swinging movements of the links 17 and 18 about the axes of the pivots 19 and 20 and upward movement of the stop member 21.

If upward movement of the stop member 21 causes the stop rollers 35 to engage the lower surface of a pallet 10, rather than entering the space 12 between adjacent pallets, the extension of the ram 27 will be interrupted until the trailing end of the pallet clears the stop roller. The hydraulic pressures utilized in the operation of the ram should be selected so that the relief valve 40 will open, permitting the ram to stall without injury to any part of the stop mechanism or the hydraulic circuitry, and the pressures selected also should be such that engagement of the stop member with the lower surface of a pallet 10 will not displace the latter from the conveyor.

If the stop member 21 does not engage the lower surface of a pallet 10, or if it does, then when the trailing edge of such pallet moves beyond the stop member, the ram 27 will extend further and rock the links 17 and 18 clockwise to the position shown in FIGS. 4 and 7, in which position the stop rollers 36 will lie in the path of the leading edge of an oncoming pallet 10. Upward movement of the stop member 21 will be limited by engagement of the pin 23 with the surface of the shoulder 24. Following projection of the stop member into the path of an oncoming pallet, the ram 27 again will stall, but will exert sufficient force on the linkage 16 to maintain the stop member 21 in its pallet-arresting position.

Upon engagement of the leading end of a pallet 10 with the stop member 21, the stop member is capable of rocking clockwise about the axis of the pin 23 from the position shown in FIG. 4 to the position shown in FIG. 8. Such limited rocking movement is permitted because of the provision of the slots 33 in the links 17 and because the coupling pin 26 is at the extreme left-hand ends of the slots 33 at the time of initial engagement of an oncoming pallet 10 with the stop member 21.

Clockwise rocking movement of the stop member 21 about the axis of the pin 23 is yieldably resisted by the hydraulic fluid to the right of the piston 29, as viewed in FIG. 10, but fluid can be displaced from the cylinder 28 into the pressure accumulator 41, if it is included, or through the relief valve 40, thereby permitting retraction of the ram 27 and rocking of the stop member 21 a distance sufficient to locate the coupling pin 26 at the right-hand ends of the slots 33, as is shown in FIG. 8. The displacement of fluid from the cylinder 28 is resisted, thereby absorbing the shock of engagement between a pallet 10 and the stop member 21 and cushioning or damping the stopping of the pallet.

The pressure relief valve 40 not only provides resistance to the flow of fluid from the cylinder 28 during cushioned stopping of a pallet 10, but also ensures against the generation of excessive hydraulic pressures in the cylinder 28. That is, should the pressure to the right of the piston 29 exceed a preselected value, somewhat greater than the pressure which can be developed by the pump P, the valve 40 will open and permit fluid to flow from the cylinder 28 to the reservoir 37.

Following stopping of a pallet on the conveyor, the fluid pressure developed by the pump P will be applied to the piston 29 and is of such capacity as to reextend the ram 27, effect counterclockwise rocking of the stop member 22 about the axis of the pin 23, and relocate the coupling pin 26 at the left-hand ends of the slots 33. The engaged pallet thus will be pushed backward a short distance on the conveyor from the position shown in FIG. 8 to the position shown in FIG. 9.

When the stop member 21 is to be withdrawn from the path of movement of the pallets, the valve 39 is shifted to the position shown in FIG. 10, thereby placing the right-hand end of the cylinder 28 in communication with the reservoir and placing the left-hand end of the cylinder in communication with the pump P so as to cause the piston 29 to move to the right. This will retract the ram 27, thereby immediately rocking the stop member 21 clockwise from the position shown in FIG. 4 and moving the coupling pin 26 from the left-hand ends to the right-hand ends of the slots 33. This movement occurs so rapidly that a clearance 45 (FIG. 9) is provided momentarily between the stop rollers 36 and the leading end of the pallet. Continued retraction of the ram 27 rocks the links 17 and 18 counterclockwise about their axes 19 and 20, thereby lowering the stop rollers 36 below the path of movement of the pallet. As a result of the provision of the space 45 and disengagement between the stop member 21 and the pallet at the initiation of retraction of the stop member, the latter is not subjected to any binding forces during its retraction.

The disclosure is representative of a presently preferred embodiment of the invention, but is intended to be illustrative rather than definitive thereof. The invention is defined in the claims.

I claim:

1. Apparatus for stopping an article movable along a path, said apparatus comprising a frame; a stop member; link means mounted on said frame for rocking movements about a first axis; pivotal means connecting said link means to said stop member for rocking movements of said stop member about a second axis; reversible, power operating means reacting between said frame and said stop member for effecting rocking movements of said link means in opposite directions about said first axis, movement of said link means in one direction about said first axis effecting movement of said stop member into said path and movement of said link means in the opposite direction effecting movement of said stop member out of said path; and lost motion coupling means interconnecting said stop member and said link means remote from said second axis and enabling limited rocking movement in each of two directions of said stop member about said second axis relative to said link means.

2. Apparatus according to claim 1 wherein said operating means comprises extensible and retractrable fluid pressure means.

3. Apparatus according to claim 2 wherein said fluid pressure means includes means enabling yieldable displacement thereof from its extended position toward its retracted position in response to engagement between said stop means and a moving article.

4. Apparatus according to claim 3 including means acting on said fluid pressure means and operable to restore the latter to its extended position following such displacement of said fluid pressure means.

5. Apparatus according to claim 1 wherein said link means comprises a parallelogram linkage.

6. Apparatus for stopping an article movable along a path, said apparatus comprising a frame; stop means engageable with such article; means mounting said stop means on said frame for movements between a first position clear of said path and a second position in which said stop means projects into said path and is engageable by such article to arrest movement thereof; extensible and retractable fluid pressure ram means mounted on said frame; means coupling said ram means to said mounting means for effecting movements of said stop means between said position; yieldable means incorporated with said ram means enabling limited cushioned retraction of said ram means in response to initial engagement of said stop means with a moving article; and means operable to restore said ram means to its extended position following said limited retraction thereof, said limited retraction of said ram means being insufficient to effect movement of said stop means a distance sufficient to enable an arrested article to pass said stop means.

7. Apparatus according to claim 6 wherein said yieldable means comprises a pressure accumulator.

8. Apparatus according to claim 6 wherein said yieldable means comprises a pressure relief valve.

9. Apparatus according to claim 6 wherein said coupling means comprises a lost motion connection between said ram means and said mounting means.

10. Apparatus according to claim 9 wherein said lost motion connection comprises a pin accommodate in a slot.

11. Apparatus according to claim 9 wherein said pin is carried by said ram means.

12. Apparatus for stopping an article movable along a path, said apparatus comprising a stop member engageable with such article; link means; means mounting said link means at one end thereof for swinging movements about an axis; means coupling said link means at the opposite end thereof to said stop member for swinging movement of the latter with said link means about said axis, movement of said link means in one direction about said axis effecting movement of said stop member into said path and swinging movement of said link means in the opposite direction effecting movement of said stop member out of said path; and reciprocable operating means for swinging said link means in opposite directions about said axis, said coupling means including a lost motion connection between said link means and said stop member for enabling movement of said stop member relative to said link means in each of two opposite directions.

13. Apparatus according to claim 12 wherein said lost motion connection comprises a pin and slot.

14. Apparatus according to claim 13 wherein said pin is carried by said stop member and said slot is in said link means.

15. Apparatus for stopping an article movable along a path, said apparatus comprising a pair of links pivoted at corresponding ends for swinging movements about parallel axes substantially normal to said path, one of said links being closer to said path than the other of said links; a stop member pivotally connected to the other end of one of said links for swinging movements wiht the latter into and out of said path, the pivotal connection of said stop member to said one of said links including a pin and a lost motion slot; lost motion means coupling said stop member to the other of said links and enabling movement of said stop member relative to said other of said links in each of two opposite directions; and operating means for swinging said links to effect movements of said stop member into and out of said path.

16. Apparatus according to claim 15 wherein said pin is in such position in said slot upon movement of said stop member into said path that said stop member is movable in response to engagement by a moving article and in the direction of movement of the latter.

17. Apparatus according to claim 16 including yieldable means acting on said stop member and yieldably opposing movement of the latter in the direction of movement of said moving article.

18. Apparatus according to claim 17, wherein said yieldable means has a capacity sufficient to move said stop member in the opposite direction following stopping of the moving article.

19. Apparatus according to claim 16 wherein movement of said stop member out of said path by said operating means enables initial movement of said stop member in the direction of movement of said article.

* * * * *